Patented July 25, 1933

1,919,833

UNITED STATES PATENT OFFICE

FRIEDRICH FELIX, OF BASEL, SWITZERLAND, ASSIGNOR TO THE FIRM OF SOCIETY OF CHEMICAL INDUSTRY IN BASLE, OF BASEL, SWITZERLAND

AZO-DYESTUFFS AND PROCESS OF MAKING SAME

No Drawing. Appplication filed September 26, 1932, Serial No. 634,987, and in Switzerland October 12, 1931.

The present invention relates to new azo-dyestuffs which are particularly important for dyeing esters and ethers of cellulose, such as acetate silk. It comprises the new dyestuffs, the process of making and applying same, and the material dyed with the new dyestuffs.

It has been found that new dyestuffs are obtained by causing the diazo-compound of 4-nitro-2-chloro-1-aminobenzene to act on a non-sulfonated mononuclear primary amine of the benzene series which contains no substituent in the meta-position to the amino-group, and corresponding with the general formula

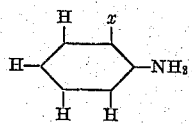

wherein $x$ stands for hydrogen, alkyl or alkoxy, or on an alkyl-ω-sulfonic acid thereof, and if required subsequently splitting off the alkyl-ω-sulfonic acid group. The dyeings obtained by means of these dyestuffs are characterized by purity and excellent fastness to light and washing. By a suitable selection of the coupling component there may be obtained dyestuffs which dye acetate silk orange to red-orange. The dyestuffs thus obtained are also excellently suited for dyeing lacquers, varnishes, artificial masses etc., produced on the basis of natural resins or artificial products, such as nitrocellulose, condensation products of sulfur or aldehydes with, respectively, phenols or bases etc.

The new products corresponding to the general formula

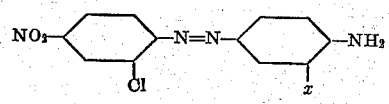

wherein $x$ stands for hydrogen, alkyl, or alkoxy, form red powders dissolving in organic solvents, such as acetic acid ethyl ester, acetone, alcohol, and the like, to orange to red-orange solutions. They are practically insoluble in water and are therefore preferably used in a finely subdivided form, into which they are brought by grinding them to form a paste with water containing a dispersing agent, for instance a sulfonated residue from the manufacture of benzaldehyde or of turpentine oil. These pastes may be used directly for dyeing or they may be converted into dry preparations which can be powdered by cautiously drying them in a vacuum at a temperature which is not too high in presence of a further quantity of the said dispersing agent or another, such as sulfite cellulose liquor.

The following example illustrates the invention, the parts being by weight:—

The solution obtained in the usual manner from 172 parts of 4-nitro-2-chloro-1-aminobenzene is introduced into a cold solution of 209 parts of the sodium salt of aniline-ω-methanesulfonic acid. When the formation of dyestuff is at an end, the whole is filtered and the dyestuff heated cautiously with 150–200 parts of caustic soda liquor of 30 per cent. strength until the methanesulfonic acid has been completely split off. Filtration and washing follow.

The dry dyestuff which corresponds with the formula

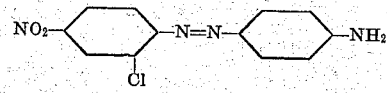

is an orange red powder which dissolves in organic solvents, like alcohol or ethyl acetate, to an orange solution and dyes acetate silk, after having been brought into suitable form, pure orange tints of excellent fastness to light, washing and water.

The operations are similar for the manufacture of dyestuffs from 4-nitro-2-chloraniline and ortho-toluidine or ortho-anisidine or ortho-phenetidine, appreciably redder dyeing products being, however, obtained.

What I claim is:—

1. Process for the manufacture of new azo-dyestuffs, consisting in combining the diazo compound of the 4-nitro-2-chloro-1- aminobenzene with an alkyl-ω-sulfonic acid of a primary amine of the general formula

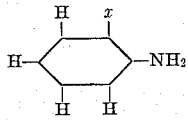

wherein $x$ stands for hydrogen, alkyl or alkoxy, and splitting off the alkyl-ω-sulfonic acid group in the dyestuffs thus obtained by treatment with saponifying agents.

2. Process for the manufacture of new azo-dyestuffs, consisting in combining the diazo compound of the 4-nitro-2-chloro-1-aminobenzene with an ω-methanesulfonic acid of a primary amine of the general formula

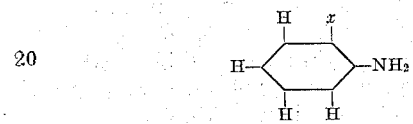

wherein $x$ stands for hydrogen, alkyl or alkoxy, and splitting off the ω-methanesulfonic acid group in the dyestuffs thus obtained by treatment with saponifying agents.

3. Process for the manufacture of new azo-dyestuffs, consisting in combining the diazo compound of the 4-nitro-2-chloro-1-aminobenzene with the aniline-ω-methanesulfonic acid, and splitting off the ω-methanesulfonic acid in the dyestuff thus obtained by treatment with saponifying agents.

4. The products of the general formula

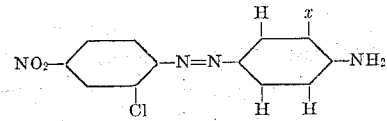

wherein $x$ stands for hydrogen, alkyl or alkoxy, which products form red powders dissolving in acetic ester to orange-red to red-orange solutions, and dyeing acetate silk from fine aqueous suspensions fast orange tints.

5. The product of the formula

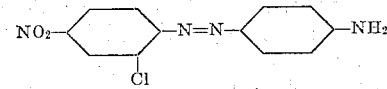

which product forms a red powder which dissolves in acetic ester to an orange-red solution, and dyeing acetate silk from a fine aqueous suspension fast orange tints.

FRIEDRICH FELIX.